Patented Aug. 18, 1925.

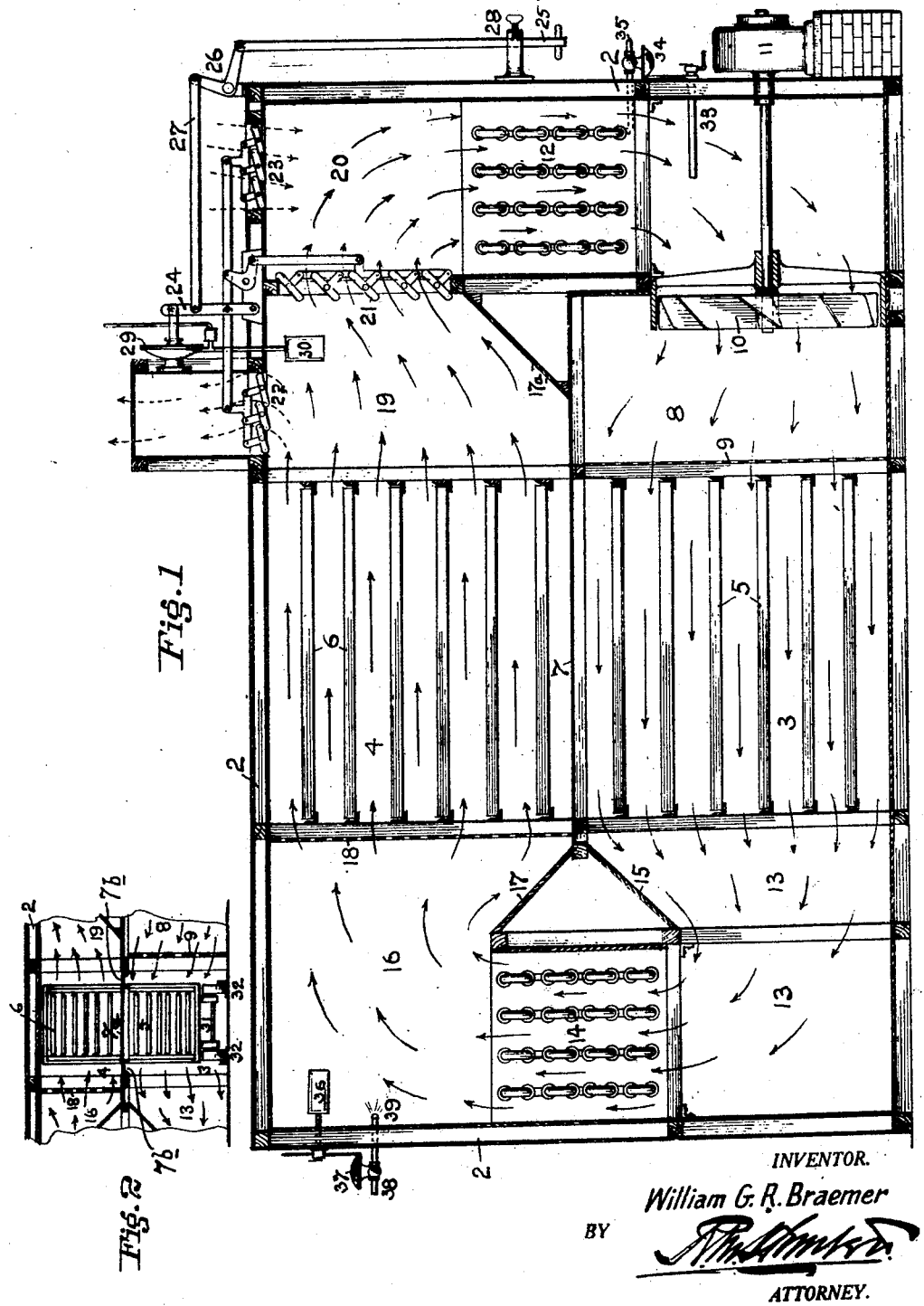

1,550,422

UNITED STATES PATENT OFFICE.

WILLIAM G. R. BRAEMER, OF CRANSTON, RHODE ISLAND, ASSIGNOR TO GENERAL FIRE EXTINGUISHER COMPANY, A CORPORATION OF NEW YORK.

METHOD AND MEANS FOR DRYING BY AIR AND OTHER GASEOUS MEDIUM.

Application filed November 11, 1922. Serial No. 600,237.

*To all whom it may concern:*

Be it known that I, WILLIAM G. R. BRAEMER, a citizen of the United States, and resident of Cranston, county of Providence, State of Rhode Island, have invented an Improvement in Methods and Means for Drying by Air and Other Gaseous Medium, of which the following is a specification.

The object of my invention is to provide a suitable method and also a means for insuring rapid and efficient drying of textile and other materials in a drying apparatus or kiln, wherein the air, as the drying medium, may be circulated in contact therewith in a relatively rapid manner and under pressure and temperature materially greater than that of the outside atmosphere; and at the same time causing a relative change in or purification of the circulating air by eliminating therefrom, in a gradual manner, portions thereof when objectionably moist and introducing into the circulating drying medium, thus modified, a corresponding equivalent of dryer air, whereby the volume of the air content within the dryer remains substantially the same and the heat units absorbed by the drying medium are conserved.

My object is further, to so restrict escape of air from the drying chamber that the air remaining within the same is circulated under a pressure materially greater than that of the outside atmosphere; and in securing this result, the air is caused to travel over the materials to be dried several times as often as it would have been circulated, if maintained at atmospheric pressure and in volume corresponding to the inflow of fresh air. Moreover, by reason of the fact that a relatively greater pressure than atmospheric pressure is maintained within the drying chamber and the circulating passages thereof, it is possible to cause a gradual change of the drying medium by permitting a portion of the air to escape under its own pressure at one part of the apparatus while maintaining a differential in the internal pressure in two separated portions thereof, whereby the action of the circulating blower creates a suction sufficient in one portion of the apparatus to cause an intake of a corresponding quantity of outside air to insure maintenance of the air volume necessary to preserve the predetermined pressure of circulation with a definite operation of the circulating blower.

My object is also to cause the air, circulated under a pressure above that of the atmosphere, to be heated and, moreover, preferably heated before being subjected to the blower and delivered to the materials to be dried; and thereafter, heated a second time, said re-heated air being circulated over a second portion of the materials to be dried. The air so employed is finally returned to the first heating means and reheated, subject, however, to the aforesaid gradual change of a portion of it by the process of elimination in respect to moist air and introduction of drier air from the atmosphere.

A further object of my invention is to provide valves or dampers for controlling the intake of fresh air and for the escape of exhausted or moisture laden air from the drying apparatus during the normal re-circulation of air therein, and also valve devices or dampers intermediate of the escape and intake valves or dampers and through which all of the remaining circulating drying medium within the apparatus is required to pass, the control of said valves or dampers being such that the desired amount of escaping air and inflow of fresh air may be insured by adjustment thereof, whether by hand or automatically under control of the hygrometric condition of the air within the apparatus.

In the practice of my improved method, the air within the apparatus (being re-circulated under pressure) is brought into intimate contact with the materials to be dried, permeating the same; and, by reason of the circulation being accomplished under said pressure, it is possible to move the air over the materials several times more often in a given time than would be possible if the air actually received into the apparatus through the intake valve or damper was circulated once over the materials and then allowed to escape, and providing always that the air was changed with sufficient rapidity to insure a desirably low relative humidity to accomplish the drying in an efficient and speedy manner. The re-circulating of the air under pressure secures results equivalent to those due to the circulating of several times as much air at atmospheric pressure, because the greater velocity of travel over the materials accomplishes the same results as a greater volume of air would secure travelling over the materials at a less velocity. It follows from this that, for the same efficiency in actual drying, the apparatus required by my improved process would be materially smaller, in so far as providing means for handling the air is concerned, than would be required where the air was circulated at atmospheric pressure. It is essential, however, and of the utmost importance for efficiency, that the apparatus shall provide for the proper escape of moist air from the re-circulated air and the substitution therefor of fresh air of low relative humidity; and it will also be understood that where the air is re-circulated under my improved method, the heat required to maintain it at a proper drying temperature and relative humidity will be far less than where air at atmospheric pressure in greater volume is the drying medium.

With the above and other objects in view, the nature of which will be more fully understood from the description hereinafter, the invention consists in the novel method and construction of means for drying by air or other drying gaseous medium, as hereinafter more fully described and defined in the claims.

In the drawing: Fig. 1 is a vertical section through a drying apparatus embodying my invention and for permitting the practice of the process, but the same is shown by way of illustration and not as restriction to the invention; and Fig. 2 is an elevation showing the use of a truck to carry the materials to be treated for introducing them into and removing them from the drying chamber.

2 represents the general outer frame of the drying apparatus and may be of wood or metal and constructed in any suitable manner, and provides confining walls within which the materials to be dried are housed or conveyed and also provides compartments or passages for directing the air currents in association with heating and circulating means. 3 and 4 are two drying chambers arranged one above the other and separated by an intermediate horizontal partition 7, the lower compartment 3 being provided with removable trays 5 in which the materials may be placed, and the upper compartment 4 being similarly provided with removable trays 6 for the same purpose. These trays 5 and 6 may be supported upon angle iron supports or otherwise in any suitable manner. 8 is an air chamber at one side of the compartment 3 and into which air, previously heated by a steam coil 12, is forced under pressure by means of a blower 10 operated by an electric or other motor 11. The air from the compartment 8 is delivered into one side of the drying compartment 3 and evenly distributed thereto by being caused to pass through a perforated distributing plate 9 arranged in an upright manner and slightly to one side of the said chamber 3. The air thus delivered to the chamber 3 passes horizontally over the materials in the trays 5 to be dried and is received in the chamber 13 to the opposite side of the chamber 3, and said air is caused to be heated by heating coils 14 to increase its temperature and lower its relative humidity. 15 is an inclined wall leading from the horizontal division 7 to the lower part of the heating coils 14 for guiding the air, passing through the upper portion of the chamber 3, downward to the bottom or intake side of the said heating coils. The air thus raised in temperature and with its relative humidity somewhat lowered, is delivered into an upper air chamber 16 and passes therefrom through a perforated distributing plate 18 to one side of the drying chamber 4 and thence horizontally over the materials on the tray 6 and delivered into a receiving chamber 19. If desired, an inclined wall 17 may be employed in the chamber 16 extending from the upper or discharge side of the heating coils obliquely downward to the horizontal division 7 for directing the air currents, downward to the lower portion of the drying chamber 4, or inversely to the function of the wall 15 in connection with the chamber 13 before referred to. The air receiving chamber 19 has a communication with an intake chamber 20 through a suitable valve device or damper 21 preferably formed of pivoted slats which, by being adjusted, vary the passage between the chambers 19 and 20 for controlling the air, the chamber 20 opening at its lower end into the upper or intake end of the heating coils 12, previously referred to.

In addition to the valve 21 controlling the re-circulation of the air within the drying apparatus, there are two additional valves, 22 and 23 respectively, for permitting the escape of contaminated air in a gradual manner and admitting the entrance of fresh air to compensate for the volume of air which has been permitted to escape, so that the total quantity of air within the apparatus and employed in circulation is maintained substantially constant. The valve 22 constitutes the escape valve and controls the escape of moisture laden air from the chamber 19, and valve 23 controls the inflow of fresh air into the chamber 20. These valves 22 and 23 may be of the shutter variety corresponding to the character of valve or damper 21, but of relatively small area, because they are employed in passing relatively small volumes at any moment of time, as compared to the large volume of air required to pass through the valve 21. In the preferred construction, the valves 22 and 23 are connected to a lever 24 and so arranged that they open and close together and to substantially the same extent. The lever 24 also, by suitable connections, operates the damper valve 21 so that when the valves 22 and 23 open, the damper valve 21 closes to some extent and vice versa, the object being that by closing the damper 21 more or less, the suction in chamber 20, under the influence of the blower 10, increases to draw in the fresh air and the pressure in the chamber increases to force out a portion of the moist air, thereby inducing a gradual change in the circulating air content so that it may be maintained under a hygrometric condition suitable for absorbing moisture from the materials being dried. The lever 24 may be mechanically operated and set by means of the rod 25, the bell crank 26 and connecting rod 27, said rod 25 being adjustable in a support 28. In this manner, the valves may be set to remain in a position which will cause a gradual removal of effete air and increase of fresh air, according to the requirements dependent upon the character of material being treated. Where desired, the regulation of these valves or dampers may be performed automatically under the control of a hygrostat 30 and a diaphragm motor 29 (of usual type in humidifying apparatus), the latter being controlled for operating the lever 24 for opening and closing the valves or dampers 21, 22 and 23, in accordance with the humidity conditions of the air in chamber 19 and circulating as the drying medium. While I prefer to put the hygrostat in the chamber 19 as being the most suitable place for its location, the same may be placed at any other position within the apparatus which will enable the proper control by the said dampers or valves.

It will now be understood that in the operation, the air is heated by the heating coils 12 before passing through the drying chamber 3 and the temperature lost in absorbing moisture during said passage is restored to the air when it reaches and passes through the second heating coils 14, so that the relative humidity of the air after leaving the compartment 3 is lowered by the re-heating in passing the coils 14 and is thereby brought to suitable condition for repeating the drying operation in passing through the upper drying chamber 4. In this chamber, it again loses temperature, which is restored to it when it again reaches the heating coils 12. In this manner, the air, in being re-circulated, is brought to a higher and higher state of humidity, and if not prevented, a point would be reached where the hygrometric condition would be such that it would no longer be suitable for efficient drying. To prevent this accumulation of moisture beyond a certain degree, I provide the valve or damper mechanism above described for gradually removing portions of the moisture laden air and replace it correspondingly by the fresh dry air, whereby a substantially constant hygrometric condition may be maintained within the drying apparatus, the same to be predetermined according to the nature and condition of the material being treated.

Aside from the control of the circulation and change in the air constituents to accomplish the maintenance of a substantially constant hygrometric condition of the circulating drying medium, the blower is maintained at a predetermined speed sufficient to build up the air pressure in the chamber 8 and thereby cause the drying medium to be compressed to a greater density than the atmosphere and retain said pressure during the re-circulation through the drying chambers 3 and 4. By proportioning the speed of the blower 10 to the resistance to be overcome, it is manifest that the circulating air may be caused to flow or circulate over the materials to be dried with a high speed; and the advantage secured to my improved method resides in the fact that, with a given capacity of blower equipment, I am enabled to greatly increase the amount of circulation of the drying medium within a given period and to force a more intimate contact between the said drying medium and the materials to be dried than is at all possible with the amount of air taken in through the valve 23 and discharged through the valve 22, thereby securing greatly more efficient results with a given sized apparatus and permitting an installation within a relatively small space.

It will also be understood that as the air is re-circulated over and over again, the heat units contained therein are retained as an important part in the process or method, insuring economy over what would result if the drying was carried on without re-circulation of the air, and wherein the heated air would be permitted to escape after passing once over the materials to be dried. With my improved method, the amount of heat lost, other than due to radiation from the apparatus as a whole, is confined to the heat units carried off in the escaping air discharge through the valve or damper 21; and under the circumstances, this may be considered as a minimum loss consistent with the proper operation of the apparatus and practically essential to the carrying out of the spirit of the invention.

It will be understood that instead of supporting the material upon trays adapted to be separately introduced and removed from the chambers 3 and 4 within the drying apparatus, said trays or other equivalent may be arranged upon a truck 31 (Fig. 2) which may be run into the drying space or chamber for more readily charging and discharging the apparatus and thereby saving time. As shown in Fig. 2, the truck 31 has a frame work upon which the trays 5 and 6 are supported and between which there is a transverse division 7ª to insure the circulation of the air across the trays 5 and 6 successively, as in Fig. 1. The drying chamber may have its sides 32 and 33 respectively provided with the hinged division parts 7ᵇ to come into alinement with the division part 7ª when the truck is in position within the chamber to insure the proper flow of the air and prevent short circuiting.

It will also be understood that in place of either the trays, as shown in Fig. 1, or with the employment of the truck feature of Fig. 2, the materials to be treated may be carried by conveyers through the drying chamber or chambers in any convenient manner, as is well known in the art of drying textile and other materials and I, therefore, do not restrict myself in this respect.

Similarly, it will be understood that the general construction of the drying apparatus, as a whole, is given by way of illustration for the elucidation of my improved process and may be greatly changed or modified in design without changing the functional results.

As it is desirable that the circulating air shall be maintained at substantially uniform temperature, I may provide a thermostatic control mechanism for this purpose. By way of example, 33 illustrates a thermostat extending into the air chamber and operates to control a motor valve 34 arranged in the steam supply pipe 35 to the heating coils 12. By these means, the temperature of the coils may be varied automatically to maintain a uniform temperature of air put into circulation by the blower. Any other suitable temperature controlling means may be employed.

It is also desirable, as in drying ceramic ware and other articles, that the humidity condition within the drying apparatus shall remain substantially constant, and, while I have provided for reducing the humidity when in excess of that required, I may employ additional means for increasing the humidity within the drying chamber to maintain a constant relative humidity. Means for this purpose may comprise a hygrostat 36 arranged within the chamber 16 and controlling a motor valve 37 which, in turn, controls water pressure in a pipe 38 for intermittently spraying the water from a nozzle 39 within the chamber 16 whenever the humidity of the circulating air decreases below a predetermined amount. It is manifest that the relative humidity within the dryer may be maintained by controlling the humidity of the air entering the chamber 20 by first treating it in an ordinary air washer provided with automatic humidity control means of the type commonly employed with air washers, and with the hygrostat located within the drying chamber, as in the case of the hygrostats 30 and 36. If the air entering the valves 23 is given the proper humidity to maintain a constant relative humidity in circulation, it will then not be necessary to employ the hygrostat 36 and the spray nozzle 39, but where the hygrostat 30 in connection with the valve dampers 22 is employed, the ordinary atmospheric air may be permitted to enter the valve dampers 23 while the hygrostat 36 and the spray nozzle 39 are employed to maintain the constant relative humidity.

I have described my improved method and means in that particularity which I deem to be the best exposition of my invention, and that which I prefer in commercial practice, but I do not restrict or confine myself to the minor or secondary details, as such are susceptible of modification which may be resorted to as matters of mechanical skill and without a departure from the spirit of the invention.

Having now described my invention, what I claim as new and desire to secure by Letters Patent is:—

1. The herein described method for drying textile and other materials, which consists in re-circulating a drying medium in a heated condition and under a pressure in excess of atmospheric pressure over and in contact with the materials to be dried, reheating the drying medium during its recirculation to maintain its temperature, interposing an adjustable resistance to the circulation of the drying medium at a place between where the medium leaves and returns to the material to be dried and whereby a pressure differential is created, said differential being greatest on the side next to the materials to be dried and from which the medium flows and lowest on the opposite side from which the re-circulation takes place, causing the drying medium when moist to be gradually removed to a greater or less extent out of circulation under automatic control by varying the pressure differential through a varying of the resistance, and simultaneously introducing corresponding quantities of fresh medium of relatively dry condition into the circulation under the automatic control of the varying pressure differential, whereby the total quantity of drying medium being re-circulated may be maintained substantially constant.

2. The method according to claim 1, wherein the variation in pressure of the circulating medium at its place of change is automatically controlled by the hygrometric condition of the circulating medium, whereby an increase in the differential between the pressures at each side of the place of resistance is caused by an increase in the humidity condition of the circulating medium, and vice versa.

3. The herein described method for drying textile and other materials which consists in re-circulating a drying medium in a heated condition and under pressure in excess of atmospheric pressure over and in contact with the materials to be dried, reheating the drying medium during its recirculation to maintain its temperature, causing the drying medium when moist to be gradually removed out of the circulation by increasing the pressure thereof on the pressure side of the circulating means on which the materials being treated are arranged and opening a restricted escape passage, and introducing into the circulation on the suction side of the circulating means corresponding quantities of fresh medium of a relatively dry condition by reducing the pressure of the circulating medium before being delivered to the circulating means and materials being treated, whereby the total quantity of drying medium being re-circulated may be definitely maintained substantially the same.

4. In drying apparatus, the combination of a continuous passage through which air may be circulated, means for supporting material to be dried within the said passage, a pressure blower for re-circulating the air through the passage and over the material to be dried therein while maintaining the said air at a pressure above atmospheric pressure, means for heating the circulating air, and means for causing a gradual escape of air from the passage and the introduction of a corresponding quantity of fresh air into the passage, whereby the total volume of air being re-circulated is maintained, said means comprising a damper controlled passage leading to the exterior of the drying apparatus, a second damper controlling an inlet passage for supplying air to the interior of the apparatus, and a third damper dividing the circulating passage at a point between the first and second dampers referred to and whose control determines the varying extent of pressures of the circulating air adjacent to the dampers, the third damper being of much greater area than either of the other two dampers.

5. The invention according to claim 4, wherein the damper means for causing the escape of air from the passage and the introducing of fresh air into the passage comprises a venting damper and an intake damper arranged respectively along the length of the passage at different positions, and the third damper arranged to provide a greater resistance to the flow of the air through the passage intermediate of the dampers for controlling the escape of air from the passage and for the introduction of fresh air into the passage respectively than is possible by either or both of the other dampers.

6. The invention according to claim 4, wherein the means for introducing a resistance to the flow of the air in the passage comprises a damper, and means for adjusting the same whereby the resistance is increased and pressure built up adjacent to the damper for controlling the escape of air and reduced adjacent to the damper for controlling the introduction of air automatically when said dampers are closed and vice versa.

7. The invention according to claim 4, wherein the valves or dampers are automatically controlled by a hygrostat arranged in position to be affected by the air circulating within the passage.

8. The invention according to claim 4, wherein the passage is returned upon itself and is provided at two places along its length with means for supporting materials to be dried, and in which further the means for heating the air is arranged in the passage intermediate of the means for supporting the two batches of materials to be dried, whereby the air leaving one batch is reheated to lower its relative humidity prior to its acting upon the next batch, and so on repeatedly and both heaters are in series relation in the circulating passage between the pressure and suction sides of the single blower.

In testimony of which invention, I hereunto set my hand.

WILLIAM G. R. BRAEMER.